INVENTOR
JOHN PAUL JONES, JR.

BY Watson, Cole, Grindle & Watson
ATTORNEYS

INVENTOR
JOHN PAUL JONES, JR.

BY Watson, Cole, Grindle & Watson
ATTORNEY

INVENTOR
JOHN PAUL JONES, JR.
BY Watson, Cole, Grindle & Watson
ATTORNEYS

United States Patent Office 3,232,404
Patented Feb. 1, 1966

3,232,404

KEYBOARD OPERATED PRINTER WITH ELECTRICAL MEANS PREVENTING OPERATION OF PLURAL KEYS

John Paul Jones, Jr., Wynnewood, Pa., assignor to Navigation Computer Corporation, Norristown, Pa., a corporation of Pennsylvania Filed Aug. 11, 1964, Ser. No. 388,893
1 Claim. (Cl. 197—49)

Figure 1:
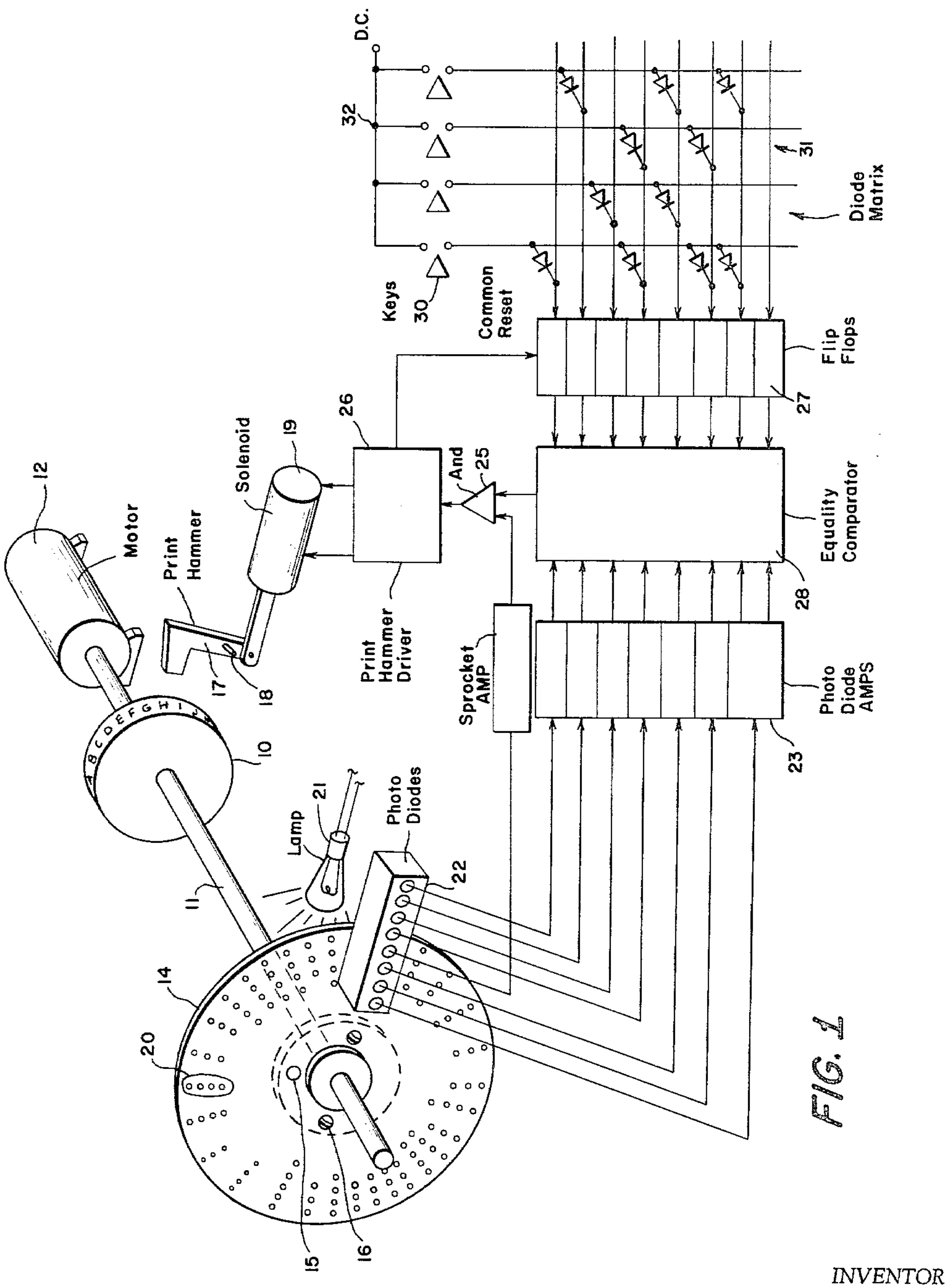

This invention relates to keyboard operated printers and more particularly it relates to electronic typewriters adaptable for use with electronic data processing equipment.

Prior printing systems, when operated directly from manual keyboard switches, have required complex electronic converters and compensators to eliminate effects of contact bounce, inadvertent manual operation of the key which may cause double printing and other irregularities in timing or printing derived from manual actuation of the keyboard.

General complexity of electronic printing systems has occurred in various coding circuits involved to convert from keyboard or input coded signal operation through the electronic internal coding system and finally reconverting to the printing code pattern involved. In prior art devices this coding has required storage of all signals into character registers when entered from the keyboard, for retention while awaiting proper time for entry into decoding circuits, since manually inserted information is asynchronous with operation of internal machine operations of coding and printing circuits.

It is therefore a major object of this invention to provide a simplified electronically controlled printing system with higher speed printing obtainable directly from manually closed keyboard switches.

Another object of the invention is to provide a keyboard operated electronically controlled printer or typewriter with accurate print spacing and simplified keyboard interlocks precluding false printing and significant space jitter.

A further object of the invention is to simplify coding apparatus necessary to convert manual keyboard entries into printed record form.

A still further object of the invention is to reduce the number of keyboard registers necessary to convey asynchronously arriving input character data into synchronous printing operations.

Therefore, in accordance with the invention, an electronic typewriter is provided with a combination of elements contributing to simplicity and speed of operation. Input data entered by the keyboard is processed for coding directly without retention in a keyboard register, and is thus processed through coding circuits before storage. This permits synchronous timing with print operations by comparison with coding of the print character carried with the typewheel in continuous rotation. Thus, signals from a code wheel are matched with coded keyboard signals to effect printing when the proper character is presented from a continuously rotating type wheel. Only coded keyboard signals connected into internal machine language, for example, binary code groups, are retained in a register, thereby simplifying the necessary auxiliary electronic equipment and electronic control circuits.

Figure 2A:
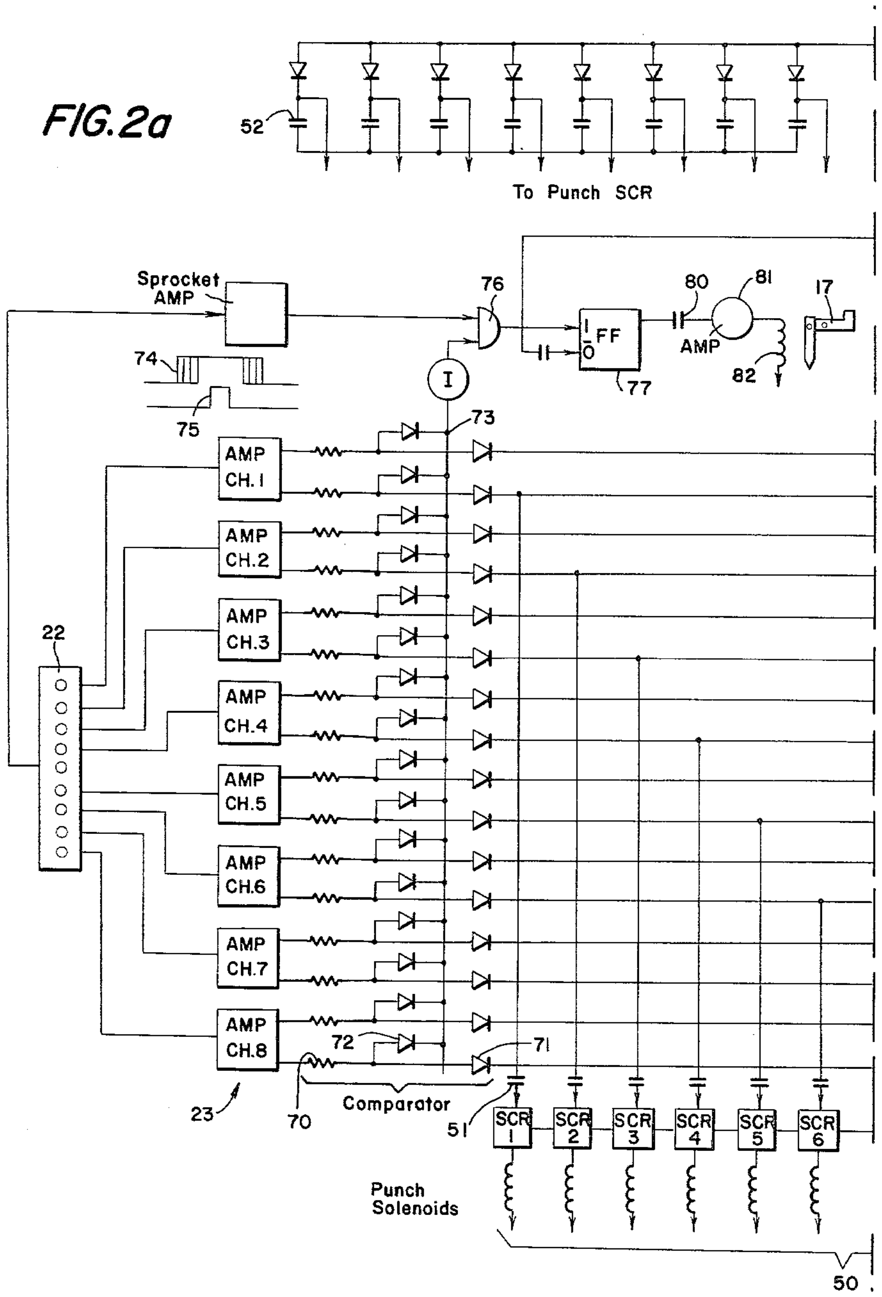
Figure 2B:
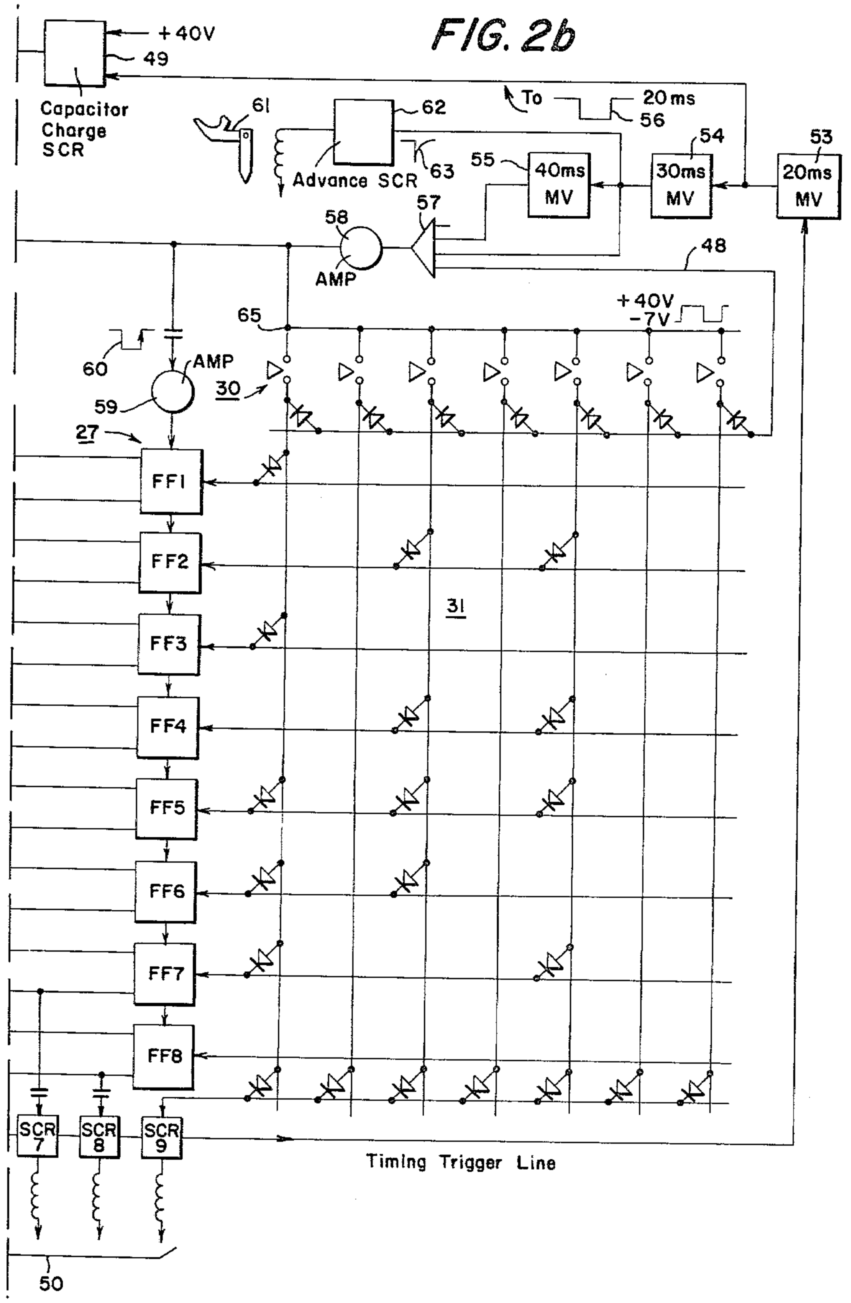

The organization of this invention is related to the co-pending application of the same inventor for Printing System, Serial No. 356,885 filed April 2, 1964, and to that of Adolph Erpel, Serial No. 369,446 filed May 22, 1964, which respectively relate to a general organization of an electronic typewriter and the construction of a particular type of bounceless manually operated key switch contact useful in the environment of the present system. Other features and advantages of the invention together with a detailed description of its construction and operation will be evident from the following specification when referenced to the accompanying drawing, in which:

FIGURE 1 is a diagrammatic view of a printing system constructed in accordance with this invention; and FIGURE 2, consisting of FIGURES 2*a* and 2*b*, is a system circuit diagram of an electronic typewriter embodying the invention.

The general organization of the printing system is shown in the sketch of FIGURE 1, wherein a rotating print wheel 10 is coupled by shaft 11 to a continuously running motor 12. An opaque coding disc 14 is keyed onto the shaft 11 by key 15 and mounting screws 16 for rotation therewith to identify the exact position of each print character as it is presented into position for impact by print hammer 17, which is pivoted about pin 18 for electromagnetic actuation when solenoid 19 is selectively energized.

Coding on the opaque disc 14, which may be of a thin opaque fiber material, may be accomplished by punching groups of parallel binary bit holes 20 therein. Thus, lamp 21 and photo diode array 22 will produce distinctive binary coded signals to the amplifier section 23 for each character presented on the type wheel. Each code grouping includes a timing sprocket hole presented to define clearly the center portion of the code reading waveform, thus producing a print trigger signal of exact timing at AND circuit 25. The print hammer driver 26 is driven when the coding group of binary bits on disc 14 compares exactly with and matches the input character code retained in the flip-flop register 27, as performed by comparator circuit 28. After printing each character, the flip-flop register 27 is reset for entry of another character to be printed by way of external data input, which may be entered through keyboard switches 30, as coded through diode matrix 31. Each key, preferably constructed as taught in the hereinbefore mentioned application, may connect a direct-current potential at lead 32 through the diode matrix 31 to set the flip-flop circuits of register 27. Thus, one feature of this invention is the simplicity afforded by entering directly into internal machine code from those characters identified by manually operated switch closures. A single set of binary coded registers 27 thus performs multiple functions and eliminates separate registers for each key to retain asynchronously entered information until called for by the internal synchronous timing cycle of the system. The overall system is therefore simple and is purely electronic except for the manual keyboard and print mechanism which even though electro-mechanical in nature are constructed simply with few movable parts for reliable operation over long periods of time.

This system is shown in more detail in FIGURE 2 where corresponding reference characters identify similar circuit elements. In addition to the printing function, this embodiment also provides for recording data on punched paper tape by way of punch solenoids 50. Each of the punch solenoids 1–8 is operated from a respective one of the coded binary bits set into the keyboard register flip-flop 27 by way of capacitors 51, during the initial period as flip-flops 27 are set by keys 30. The punch solenoids are actuated by silicon controlled rectifiers (SCR) which are triggered to discharge through the punch solenoids from the charge on capacitors 52, which is retained during the punch cycle by charge circuit 49, and held discharged at other times during a recording cycle to prevent any danger of double punching.

Every character input keyboard entry produces a timing pulse at SCR 9 and this initiates a three-step timing cycle progressing through punch cycle multivibrator 53, print cycle multivibrator 54 and paper tape advance multivibrator 55. Respective time intervals of 20 ms. for punching, 30 ms. for completion of a printing character and 40 ms. to move the paper, provide an overall punch operation cycle of more than ten characters per second. Thus the capacitors 52 are discharged to operate the punch solenoids during the first 20 ms. shown on waveform 56 from the punch cycle multivibrator. This waveform also passes through to OR circuit 57, blanking amplifier 58 and reset amplifier 59 to produce a signal for reset of flip-flops 27 as indicated by the arrow on the trailing edge of waveform 60.

Thereafter, the punch paper tape is advanced by escapement 61 during the paper advance interval as directed by the advance driver 62 initiated at the end of the 30 ms. delay period by way of trigger pulse 63. The advance multivibrator 55 along with other operations inserted at OR circuit 57 serves to prevent start of another cycle until the paper is in place. This in effect blanks the keyboard power at lead 65 through blanking amplifier 58, which changes the D.-C. key potential from +40 volts to −7 volts. Thus, the flip-flops 27 can only be set by key closure during the period of time that no signals are produced at OR circuit 57 for driving the blanking amplifier 58.

Dioide matrix 31 serves in a conventional manner to convert each character identified by closure of a key 30 to a binary code corresponding to that on the print wheel decoding disc before it is stored in the flip-flop register 27. Thus, the representative keys herein convert a D.-C. level directly into coded binary form before storage, to eliminate the need for a series of registers to hold the keyset signals as an electronic potential level until needed in the system.

The keyboard itself also serves to lock out the keyboard operation when certain keys are depressed as seen by feedback lead 48 entering the OR circuit 57.

With respect to the printing operation as described in connection also with FIGURE 1, the comparator section comprises a series of AND circuits each including a resistor 70 and diode 71. The results of each AND comparison are OR-ed together in a series of mixing diodes 72 to produce on lead 73 a signal whenever the code group in flip-flops 27 matches exactly the code presented by the photo disc diodes 22 in amplifiers 23. The resulting combined match signal at 73 may be jittery as represented by waveform 74 with undefined leading and trailing edges so that a clean sprocket pulse 75 is used to gate or strobe the match signal at AND circuit 76 after the match signal is inverted at I.

Accordingly the print flip-flop 77 is timed to operate print hammer 17 responsive to timing of the code signals and sprocket pulse on rotating disc 14. This effects the simplest form of apparatus for a system of printing from a keyboard character presented in one out of *n* code, since by converting to binary code and then reconverting to one out of *n* character code in the manner accomplished for alphanumeric printout herein requires little control circuitry, few registers and extremely simple coding circuitry. Complete alphanumeric may actually be accomplished with only 5 columns.

The printer can only operate once per print-punch cycle since the transition of flip-flop 77 from "1" to "0" is used via capacitor 80 and amplifier 81 to actuate print solenoid 82.

Accordingly, by encompassing direct-current keyboard operation and photoelectric decoding of the position of the continuously rotating typewheel, in a system, a simplified and reliable electronic typewriter is produced with versatile potential applications wherever keyboard operation and electronic input signals are used together, such as in data processing systems.

What is claimed is:

In a printing system of the type including a continuously running motor, a rotating type wheel driven by said motor, a rotating code disk assembly driven by said motor with distinctive multi-bit binary code groups defining the position of each type character on said wheel, the improvement comprising, a register for receiving coded input data characters in the form of a set of binary bits of one of said groups, means reading said code groups from said code disc successively, means producing a sprocket strobe pulse from said code disc intermediate the presentation of each code group, means comparing the coded input characters with the sequence of code groups to obtain a match signal, means producing a printing signal upon coincidence of said sprocket pulse and said match signal, and hammer means operated responsive to said printing signal to impact said rotating type wheel instantaneously, wherein a keyboard comprises a set of switches each identifying a type character, and a coding matrix coupling said switches to said register to convert the type character identification made by closing each key switch into the corresponding code group on said coded disc at said register, including means establishing two levels of D.-C. potential at each keyboard switch, one level only capable of operating said register, and electronic means responsive to closure of any one keyboard switch to instantaneously change the level of said potential to that incapable of operating said register.

References Cited by the Examiner

UNITED STATES PATENTS

| | | | |
|---|---|---|---|
| 2,625,100 | 1/1953 | Williams | 197—49 X |
| 2,745,532 | 5/1956 | Crawford | 197—1 |
| 2,787,210 | 4/1957 | Shepard | 101—93 |
| 2,799,222 | 7/1957 | Goldberg et al. | 101—93 |
| 2,840,216 | 6/1958 | Larson et al. | 197—107 X |
| 2,842,048 | 7/1958 | Heuer | 101—93 |
| 2,874,634 | 2/1959 | Hense | 101—93 |
| 2,919,967 | 1/1960 | Schwertz | 101—93 |
| 3,064,561 | 11/1962 | Mauduit | 101—93 |
| 3,112,693 | 12/1963 | Williams | 197—1 X |
| 3,115,092 | 12/1963 | Sasaki | 101—93 |
| 3,131,627 | 5/1964 | Anderson et al. | 101—93 |
| 3,139,820 | 7/1964 | Kittler | 101—93 |
| 2,919,967 | 1/1960 | Schwertz | 101—93 |
| 3,144,821 | 8/1964 | Drejza | 101—93 |
| 3,152,540 | 10/1964 | Pensavecchia et al. | 101—93 |
| 3,167,002 | 1/1965 | Kaneda et al. | 101—93 |

References Cited by the Applicant

UNITED STATES PATENTS 3,195,453 7/1965 Thiemann.

DAVID KLEIN, *Primary Examiner.*

ROBERT E. PULFREY, *Examiner.*

EDGAR S. BURR, *Assistant Examiner.*